(12) United States Patent
Braun (10) Patent No.: US 12,458,398 B2
(45) Date of Patent: Nov. 4, 2025

(54) TROCAR AND MINIMALLY INVASIVE SURGERY DEVICE

(71) Applicant: Tuebingen Scientific Medical GmbH, Tübingen (DE)

(72) Inventor: Marcus Braun, Weil im Schönbuch (DE)

(73) Assignee: Tuebingen Scientific Medical GmbH (DE)

( * ) Notice: Subject to any disclaimer, the term of this patent is extended or adjusted under 35 U.S.C. 154(b) by 290 days.

(21) Appl. No.: 18/268,508

(22) PCT Filed: Dec. 22, 2021

(86) PCT No.: PCT/EP2021/087363
§ 371 (c)(1),
(2) Date: Jun. 20, 2023

(87) PCT Pub. No.: WO2022/136580
PCT Pub. Date: Jun. 30, 2022

(65) Prior Publication Data
US 2024/0023990 A1   Jan. 25, 2024

(30) Foreign Application Priority Data
Dec. 23, 2020   (DE) .................... 10 2020 134 921.1

(51) Int. Cl.
*A61B 17/34*   (2006.01)
*A61B 90/00*   (2016.01)
*A61M 25/01*   (2006.01)

(52) U.S. Cl.
CPC .... *A61B 17/3423* (2013.01); *A61B 2090/067* (2016.02); *A61M 25/0113* (2013.01)

(58) Field of Classification Search
CPC .......... A61B 17/3423; A61B 2090/067; A61B 34/30; A61B 2017/00398; A61B 17/3421; A61M 25/0113
See application file for complete search history.

(56) References Cited

U.S. PATENT DOCUMENTS

2003/0208207 A1   11/2003  Ayer
2005/0234435 A1   10/2005  Ayer
(Continued)

FOREIGN PATENT DOCUMENTS

DE   602004007999 T2   4/2008
EP        3225207 A1   10/2017
(Continued)

OTHER PUBLICATIONS

German Search Report for German Application No. 10 2020 134 921.1, with partial English translation, dated Sep. 9, 2021, 16 pages.
(Continued)

*Primary Examiner* — Richard G Louis
(74) *Attorney, Agent, or Firm* — Buchanan Ingersoll & Rooney PC (57) ABSTRACT

A trocar comprising a trocar housing, a drive unit designed and configured to move the surgical instrument, a coupling unit designed and configured to couple and uncouple the drive unit to and from an external drive source, the coupling unit comprising an input shaft being supported by the trocar housing, the input shaft being designed and configured to be driven by the drive source, and a transmission/gearbox designed and configured to convert a rotational movement of the input shaft about the longitudinal input shaft axis into a translational movement of the surgical instrument within to the trocar along a longitudinal trocar direction. Also provided is a minimally invasive surgical device equipped with this trocar.

15 Claims, 6 Drawing Sheets

(56) References Cited

U.S. PATENT DOCUMENTS

| | | |
|---|---|---|
| 2007/0185453 A1 | 8/2007 | Michael et al. |
| 2016/0089181 A1 | 3/2016 | Johnson |
| 2017/0086932 A1 | 3/2017 | Auld et al. |
| 2017/0112527 A1 | 4/2017 | Inoue |
| 2018/0368862 A1 | 12/2018 | Jain et al. |
| 2019/0200846 A1 | 7/2019 | Dejima |
| 2020/0000532 A1 | 1/2020 | Kreissig et al. |
| 2023/0038991 A1 | 2/2023 | Braun |

FOREIGN PATENT DOCUMENTS

| | | |
|---|---|---|
| JP | 2016016237 A | 2/2016 |
| WO | 2019197056 A1 | 10/2019 |

OTHER PUBLICATIONS

International Search Report and Written Opinion for International Application PCT/EP2021/087363, dated Mar. 23, 2022, 9 pages.
Office Action (Notice of Reasons for Refusal) issued Jul. 29, 2025, by the Japanese Patent Office in corresponding Japanese Patent Application No. 2023-538770 and an English translation of the Office Action. (11 pages).

TROCAR AND MINIMALLY INVASIVE SURGERY DEVICE

This application is a U.S. National Phase application of PCT International Application No. PCT/EP2021/087363, filed Dec. 22, 2021, which claims the benefit of DE 10 2020 134 921.1, filed Dec. 23, 2020, both of which are incorporated by reference herein.

The present invention relates to a trocar as well as a minimally invasive surgical device, preferably in form of a surgical robot, which is equipped with/connected to this trocar.

BACKGROUND OF THE INVENTION

A trocar is an auxiliary device which is used in minimally invasive surgeries in order to provide an access to a patient's body, for instance through an abdominal wall of the body, for a surgical instrument, as well as to seal off an operation site from an operation environment in a gas-tight manner. The trocar is formed as a trocar tube/sleeve/housing providing access for the surgical instrument, whereby the surgical instrument can be inserted into the body through the trocar tube/sleeve/housing. More specifically, the trocar housing has a distal preferably small diameter tube portion designed and configured to penetrate/enter into the body, as well as a proximal preferably large diameter tube portion designed and configured to extra-corporeally insert the preferably minimally invasive surgical instrument into the trocar in a longitudinal trocar direction.

For moving and/or actuating the surgical instrument, the trocar comprises a drive unit/device designed and configured to move the surgical instrument at least in/along (and/or about/around) the longitudinal trocar direction, for which at least parts of the drive unit are accommodated in the trocar housing, in particular in the proximal tube portion. For power supply, the trocar comprises a coupling unit/device designed and configured to couple and uncouple the drive unit to and from an external drive source, e.g. in form of a motor.

In general in surgery, the sterility of components which come into contact with the patient's body is of major importance. Hence, the trocar as a whole is usually designed as a single-use component being disposed after one-time surgical use, including the parts of the drive unit accommodated in the trocar housing.

Nowadays, an increasing number of surgeries, in particular minimally invasive surgeries, are robot-assisted, that is, carried out by means of or with aid of a surgical robot. The surgical robot can be used for precisely holding, moving and/or actuating auxiliary devices, such as the trocar, and/or instruments, such as the surgical instrument that can be inserted through the trocar, to their destination and at their place, respectively.

In particular in the robot-assisted surgery, as not all parts of the robot can be sterilized or designed as a single-use component due to economic reasons, the surgical robot is subdivided in a non-sterile zone/portion and a sterile zone/portion, which are separated from each other by a sterility barrier, e.g. in form of a plastic foil/sleeve/sheath/cover. The major parts of the robot, e.g. including drive sources, joints and slides, are located in/within the non-sterile portion, whereas at least a port/interface, that is suitable for connecting sterile components (in particular the trocar) to the robot in such a way that the sterile components can be held, moved and/or actuated, is located in the sterile portion.

PRIOR ART

From the state of the art, e.g. according to EP 3 225 207 A1, a trocar of the present type is known in combination with a corresponding surgical device in the form of a computer-controlled robot arm, according to which a free end of the robot arm can approach a certain point in space via corresponding joints/hinges or slides/telescopes in the arm mechanics. An interface is formed at the free end to which the trocar can be/is connected. Inside the trocar, a drive device is provided which can rotate a minimally invasive instrument supported in the trocar about its longitudinal axis and/or move it in/along its longitudinal axis.

As the trocar is a single use component as described above, the costly drive source for the drive unit should not be located in the trocar itself, but rather in the robot arm. Thus, the interface at the free end of the robot arm must have a coupling through which a driving force/power can be transmitted from the robot arm-side drive source via the coupling unit of the trocar to the trocar-side drive/drive unit and which at the same time permits mounting and dismounting of the trocar on/from the robot arm.

However, the known couplings are not suitable for the present purpose, as they do enable neither the required functionality nor to design the trocar as an inexpensive, disposable component.

BRIEF DESCRIPTION OF THE INVENTION

In view of the problems described above, it is an object of the present disclosure to provide a trocar with an own instrument drive being simple in design such that the trocar may be applicable as a single use component (or multi use component) to improve the guarantee of sterility as well as functional and versatile in use. Preferably, the trocar should be simple and inexpensive in design as well as easily connectable to and/or functionally operable (e.g. movable and/or actuatable) by a minimally invasive surgical device such as a surgical robot. Further, it is the object of the present disclosure to provide a minimally invasive surgical device which is equipped with such a trocar, while ensuring the sterility.

The above objects are achieved by a trocar comprising the features of claim 1 and a minimally invasive surgical device comprising the features of claim 12, respectively. Advantageous configurations of the disclosure are subject-matter of the dependent claims.

The gist of the present disclosure refers to a trocar having an (own/internal) instrument drive, wherein a drive/input shaft is provided for transmitting a drive force/power from a (external) drive source to a surgical instrument shiftably supported within the trocar in its longitudinal direction, said drive/input shaft penetrates the trocar in its traverse/substantially radial direction and comprises at least a wheel/roller/gear assembly or wheel/roller/gear portion within the trocar being adapted to (preferably directly or indirectly) engage with the surgical instrument being already inserted into the trocar such that a rotation of the drive/input shaft around its longitudinal axis is transmitted to the surgical instrument via the wheel/roller/gear or wheel/roller/gear portion to shift the surgical instrument along its longitudinal axis inside the trocar. The drive/input shaft and at least the wheel/roller/gear or wheel/roller/gear portion are members of a coupling unit of the instrument drive.

More concrete, a coupling unit is provided comprising the input or drive shaft (hereinafter referred to as the (first) input shaft) being supported by a trocar housing such that the input shaft is rotatable about its longitudinal input shaft axis relative to the trocar housing. The longitudinal input shaft axis is transverse, in particular perpendicular, to the longitudinal trocar direction (wherein the central axis of the shaft does not meet/cut the central axis of the trocar). The input shaft is designed and configured to be driven by a drive source preferably by frictional and/or positive locking. That is, the input shaft can be driven by the external drive source and freely rotate in the trocar housing around the longitudinal input shaft axis. Further, the coupling unit comprises a transmission/gearbox accommodated in the trocar housing, and designed and configured to convert a rotational movement of the (first) input shaft about the longitudinal input shaft axis into a translational movement of the surgical instrument within/relative to the trocar in/along the longitudinal trocar direction. The instrument (which can also be formed as an optic or the like) is not subject matter of the trocar.

In other words, the driving force/power, in form of a driving torque, is transmitted from the drive source to the surgical instrument via the (first) input shaft having its longitudinal input shaft axis transversely arranged to the longitudinal trocar direction (which is the axis along which the desired translational movement is supposed to be generated). Further, the transmission/gearbox converts the driving torque of the input shaft into the translational drive for the surgical instrument within the trocar housing. That is, the desired translational movement is driven via the rotational movement of the input shaft (from outside the trocar), which rotational movement in turn is converted by the transmission/gearbox (located inside the trocar).

Thus, a rather simple construction of the coupling unit comprising the input shaft and the transmission/gearbox located within the trocar—and thus inexpensive to optionally design as a single use component—combined with a simple, namely rotary coupling to the drive source outside the trocar makes it possible to drive the instrument in translation (axial shift) and ensure sterility of the trocar due to the simply constructed interface in form of the input shaft. That is, providing the trocar with the additional transmission/gearbox within the trocar enables to simplify the structure of the interface to the external drive source and thus, to improve sterility. In contrast to known trocars, neither trocar-internal instrument drives nor complex translatory couplings to the external drive source like belt/chain drives, etc. are necessary to realize a translational relative displacement between the two components, namely the trocar and the surgical instrument).

Expressed in yet other words, the trocar is formed as a passively driven unit—that is, without the drive source being directly/internally installed on/at it—being connectable/mountable, in particular in an exchangeable manner, e.g. via known rotary couplings, to the external drive source which provides the trocar with driving force. The transmission/gearbox being adapted to (directly) engage with the surgical instrument and being accommodated within the trocar housing converts the driving force/rotational movement of the input shaft into the desired longitudinal movement.

Additionally, in case the trocar is held exclusively via the input shaft and due to the rotatable support of the input shaft within the trocar housing, the trocar housing can freely (passively) swing/pivot around the input shaft such that the trocar is enabled to pivot around an invariant pivot point which is determined by the trocar in the patient's body in case the input shaft is moved transverse to its longitudinal input shaft axis. Therefore, the inserted instrument can also be tilted during surgery. In such a case, although each relative rotation between the trocar housing and the input shaft which results from tilting/inclining the trocar would be converted to the longitudinal/translational movement of the surgical instrument, this movement of the instrument (resulting from swinging of the trocar housing around the input shaft) is small due to the transmission ratio of the transmission/gearbox and thus, can be neglected or possibly compensated by rotating the input shaft in the corresponding opposite direction when tilting the trocar.

According to a preferred embodiment, the coupling unit may additionally comprise a (drive) connecting piece being designed and configured as that element by which the trocar housing is, preferably exclusively, mounted and demounted to and from an external holding device (interface at a robotic arm). The connecting piece may form a mounting/holding axis of the trocar. Preferably, the mounting/holding axis may correspond to the longitudinal input shaft axis. That is, the trocar may be hold and driven via the same axis. According to the preferred embodiment, the connecting piece may be formed at a (first) free end portion of the input shaft and laterally protrude outwards from the trocar housing. Preferably, the connecting piece may be formed by a drive source-side end portion of the input shaft. Alternatively, the coupling unit may comprise a shaft/an element separate from the input shaft forming the connecting piece, the shaft having the same axis as the input shaft and being rotatably supported by the input shaft (that is, relatively rotatable to the input shaft). The expression "exclusively mounting and demounting" means that no other mounting/demounting device is provided for holding and/or moving the trocar/trocar housing. In other words, the connecting piece is designed and configured for holding the trocar at its destination and/or moving the trocar to a destination in space, that is, changing a position/location or an inclination/orientation of the trocar. In yet other words, the longitudinal input shaft axis may form the mounting axis for the trocar for connecting it to the external holding device, e.g. in form of the surgical device, in particular a surgical robot. That is, the longitudinal input shaft axis forms not only the drive axis for translational movement of the surgical instrument inside the trocar, but also the mounting axis for the trocar as a whole. Thus, the input shaft forms both the connecting piece for holding and/or moving the trocar as well as the drive input component for the translational movement of the surgical instrument, that is, the input shaft forms an (trocar-side) interface to the external drive source and the external holding device. Consequently, the interface for connecting the trocar to the surgical device, as the robot, is formed by the input shaft only and therefore even more simplified as well as easy to sterilize (if needed).

According to a preferred embodiment, the coupling unit may additionally comprise a trocar connecting piece formed at a second (free) end portion of the input shaft, the second end portion being accommodated in the trocar housing and being axially secured in the trocar housing. Preferably, the trocar connecting piece may be formed by a trocar-side end portion of the input shaft. Preferably, the input shaft may be releasably connected to the trocar (the trocar housing). For example, the input shaft may be axially held in the trocar by a ball catch or the like. Thus, it is possible to first connect the input shaft to the external drive source and then attach the trocar itself to the input shaft. That is, in an embodiment the trocar (the trocar housing) may be only designed and configured to be connected with an input shaft as described above and the input shaft may be not subject matter of the trocar itself.

In other words, according to a central aspect of the present disclosure, the trocar (housing) is both supported/mounted on the longitudinal input shaft axis of the input shaft as well as driven by the rotation of the input shaft about the longitudinal input shaft axis of the input shaft to cause the longitudinal movement. Hence, a position, i.e. a position/location and an inclination/alignment, of the trocar housing can be set by moving the input shaft. Preferably, the trocar housing is supported in such a way on the longitudinal input shaft axis that individual components of the trocar can be moved/driven by the input shaft without effecting the position of the trocar in space. Thus, the interface can be simplified as described above.

According to a preferred embodiment, the drive unit may comprise at least one, preferably exclusively one, drive wheel coupled to the input shaft, and designed and configured to roll on an instrument shaft of the surgical instrument when rotated around its drive wheel axis to cause the translational movement of the surgical instrument. In other words, the at least one drive wheel is designed and configured to move the surgical instrument by the rolling resistance (friction) between the drive wheel and the instrument shaft, that is, translationally along the longitudinal trocar direction with a frictional connection. Specifically, the at least one drive wheel may form a frictional linear drive for the surgical instrument. The at least one drive wheel is accommodated in the trocar housing, in particular in the proximal tube portion thereof. According to the embodiment, the at least one drive wheel may be integrally formed with the input shaft (thereby forming a wheel portion of the input shaft), accommodated in the trocar housing.

Alternatively, the at least one drive wheel may be formed as a wheel being separate from the input shaft and coupled to the input shaft. Preferably, the separate drive wheel may be connected/coupled to the input shaft via an intermediate transmission. Thus, a speed ratio can be set via the transmission. More preferably, the drive wheel axis is transverse, in particular perpendicular, to the longitudinal input shaft axis. Thus, the rotation can be transmitted between the axes via the transmission.

According to a more preferred embodiment, the at least one drive wheel may have a friction lining and/or a profile in its contact area to the instrument shaft. Thus, the frictional connection/maximum torque to be transmitted can be increased. Alternatively, the at least one drive wheel may be designed and configured to move the surgical instrument by positive locking, e.g. in form of a toothed wheel/gear wheel.

According to the preferred embodiment, the drive wheel may comprise a driven portion being rotatably drivable about the drive wheel axis and a roll portion rolling (or being configured to roll) on the surgical instrument such that the translational movement of the surgical instrument is caused. The roll portion may have the friction lining and/or profile as described above. The driven portion and the roll portion may be arranged axially spaced/side by side along the drive wheel axis, that is, the driven portion and the roll portion may be formed by different axial portions of the drive wheel.

According to a preferred embodiment, the drive unit may comprise at least one pressing/clamping/biasing element/unit, e.g. in form of at least one pressing/clamping/biasing wheel or a pre-tensioned/biasing spring, designed and configured to press/bias the instrument shaft against the at least one drive wheel. This prevents the at least one drive wheel from pushing the instrument shaft away and thus from slipping without transmitting the translational force. For avoiding a bending moment applied to the instrument by the drive wheel, the at least one pressing element can preferably be arranged essentially at the same height as the drive wheel along the longitudinal trocar direction. Preferably, the at least one pressing/clamping element may be accommodated in the trocar housing, in particular in the proximal tube portion thereof. More preferably, the at least one pressing/clamping element, in particular in form of the at least one pressing/clamping wheel may be rotatably supported within/in the trocar housing about its pressing wheel axis in order to avoid applying any frictional torque to the instrument shaft that reduces/counteracts the axial translation. Further, the longitudinal pressing wheel axis and the drive wheel axis may be preferably arranged in a common plan perpendicular to the longitudinal trocar direction, e.g. axially parallel each other. Thus, a compact design ensuring functionality is provided.

Further, according to the preferred embodiment, the pressing wheel may be rotatably drivable about its pressing wheel axis. That is, the pressing element may also function as drive wheel causing the translational movement of the surgical instrument. Preferably, the pressing wheel may be coupled to the (first) input shaft such that the rotation of the input shaft rotates the pressing wheel about its pressing wheel axis. For example, the pressing wheel may comprise a driven portion being rotatably drivable about the pressing wheel axis. Further, the driven portion may be configured such that the rotation of the (first) input shaft causes the pressing wheel to rotate about its pressing wheel axis. Alternatively, the pressing wheel may be rotatably drivable, separately and independently from the rotational drive of the drive wheel. Moreover, according to the preferred embodiment, the pressing wheel may preferably comprise a clamping portion pressing the instrument against the drive wheel. The clamping portion may roll (or be configured to roll) on the surgical instrument also causing the translational movement of the surgical instrument. The driven portion and the clamping portion may be arranged axially spaced/side by side along the pressing wheel axis, that is, the driven portion and the clamping portion may be formed by different axial portions of the pressing wheel.

According to a preferred embodiment, the drive unit may comprise at least one lever or bracket coupled to the at least one pressing element and being operable to switch/displace the at least one pressing element between a pressing/clamping position, in which the at least one pressing element is configured to press the instrument shaft against the drive wheel, and an instrument changing position, in which the pressing element is configured to be spaced apart from the instrument shaft. Additionally or alternatively, the drive unit may comprise at least one lever or bracket coupled to the at least one drive wheel and being operable to switch/displace the at least one drive wheel between a pressing position, in which the at least one drive wheel is configured to contact the instrument shaft (clamping the instrument shaft between the drive wheel and the pressing element), and an instrument changing position, in which the drive wheel is configured to be spaced apart from the instrument shaft. In other words, locking/clamping or unlocking the surgical instrument between the at least one drive wheel and the at least one pressing element can be actuated by the lever. Preferably, the at least one lever may be (e.g. manually) operable/actuatable/accessible from outside the trocar housing, in particular arranged and/or mounted outside the trocar housing.

According to a preferred embodiment, the trocar may comprise at least one angle determination element being designed and configured in such a way that a rotary angle of the angle determination element is measured by an external rotary angle sensor, preferably by contact detection or contactless detection of the external rotary angle sensor.

According to a preferred embodiment, the trocar may comprise at least one centring sleeve being (integrally) rotationally coupled to the trocar housing, in particular by positive locking. Preferably, the at least one centring sleeve may have a sleeve axis corresponding to the longitudinal input shaft axis. Preferably, the at least one centring sleeve may be rotatably supported on the input shaft about the longitudinal input shaft axis. The at least one centring sleeve may have an angle determination portion constituting the angle determination element, in particular for contact detection. For example, the angle determination portion may be formed at an end portion of the centring sleeve. For example, the at least one centring sleeve may comprise a trocar-side end portion and a drive source-side end portion, the drive source-side end portion forming the angle determination portion. That is, the at least one centring sleeve as such does not have a sensor to detect its rotational position, but serves as an (axial) extension of the trocar housing in order to be able to detect the corresponding rotational position of the trocar housing by detecting the rotational position of the at least one centring sleeve (via the external rotary angle sensor).

According to a preferred embodiment, the trocar may comprise at least one angle determination transmitter being (integrally) rotationally coupled to the trocar housing. The angle determination transmitter, preferably in form of a magnet, may constitute the angle determination element, in particular for contactless detection. That is, the at least one angle determination transmitter/magnet may be designed and configured in such a way that the rotary angle and thus, the inclination angle of the trocar as a whole, may be contactless detected by the external rotary angle sensor.

According to a preferred embodiment, the angle determination transmitter may be arranged and formed in such a way that its (axial) position varies depending on the rotary angle of the angle determination element, and thus of the trocar. In particular, the angle determination transmitter may be formed as a metal plate extending, for example, in a helical/spiral shape over an arc section (around the longitudinal input shaft axis). Since the (axial) distance between the metal plate and a fixed, in particular inductive sensor mounted on the robot arm, for example, and thus the strength/size of a signal detected by it changes with the rotation of the trocar, the rotary angle of the trocar can be determined from the detected signal. Preferably, the angle determination transmitter may extend over a limited arc section, for example over 90°, i.e. not over the entire circumference, since the maximum possible rotary angle is relatively small.

According to the preferred embodiment, the at least one centring sleeve may be designed and configured in such a way that the centring sleeve can (only) be connected to the trocar housing in a predetermined rotational orientation about the longitudinal input shaft axis, for example, having a locking element on its circumference configured to engage with a corresponding locking receiving element of the trocar housing in the predetermined rotational orientation. For example, the locking receiving element may be formed as a projecting portion of the trocar housing, protruding radially inwards only partially over an inner circumference of the trocar housing. Due to the predetermined rotational orientation, detecting the rotational position of the centring sleeve allows a unique conclusion to be drawn about the rotational position of the trocar housing.

According to the preferred embodiment, the at least one centring sleeve may have an orientating portion designed and configured to orientate the centring sleeve in the predetermined rotational orientation when connecting the centring sleeve to the trocar housing. For example, the orientating portion may be formed as a surface tapering radially inwards over a peripheral portion of the centring sleeve, in particular tapering radially inwards toward the locking element. Thus, the centring sleeve automatically rotates into the predetermined rotational orientation when inserted axially into the trocar housing.

According to a preferred embodiment, the trocar may comprise a sterility barrier, for example including a sterility foil, being designed and configured to separate non-sterile parts of the trocar from sterile parts of the trocar. Preferably, the sterility barrier may separate the drive source-side end portion of the input shaft, in particular forming the connecting piece, from the trocar-side end portion of the input shaft in a sterile manner. Preferably, the sterility barrier may be designed and configured to separate the angle determination portion and the trocar-side end portion of the centring sleeve in a sterile manner. Thus, the sterility barrier enables to separate non-sterile portions of the trocar that come into contact with the external surgical device from sterile portions of the trocar that come into contact with the patient. Alternatively or additionally, the sterility barrier may be designed and configured to separate the angle determination transmitter from the external rotary angle sensor in a sterile manner. Due to the contactless detection, a signal of the angle determination transmitter may be detected through the sterility barrier by the external rotary angle sensor.

According to the preferred embodiment, the sterility barrier may be designed and configured to be fixed to the external holding device and supported rotatably about the longitudinal input shaft axis relative to the trocar housing and/or the input shaft. Thus, the sterility barrier may preferably form the connecting piece for holding the trocar in place via the robot arm.

According to a preferred embodiment, the trocar housing may have a receiving element being designed and configured to receive the surgical instrument with positive locking against rotation about the longitudinal trocar direction. The receiving element may preferably have an oval cross-section. This prevents unintentional rotation of the instrument shaft when the translation movement is transmitted non-positively from the drive wheel to the instrument shaft. Accordingly, the instrument shaft may have a corresponding oval cross-section.

According to another aspect of the present disclosure, the coupling unit may comprise a second input shaft (second drive shaft) being supported by the trocar housing such that the second input shaft is rotatable about a longitudinal second input shaft axis relative to the trocar housing. The longitudinal second input shaft axis may be transverse to the longitudinal trocar direction, in particular the same as the longitudinal input shaft axis. That is, the first input shaft and the second input shaft may be arranged coaxially/have a common drive axis. For example, the first input shaft or the second input shaft may be formed as a hollow shaft rotatably supporting the corresponding other input shaft therein. Further, the second input shaft may be designed and configured to be driven by the drive source by frictional and/or positive locking. That is, the first input shaft and the second input shaft are designed and configured to be driven by the same external drive source. Hereby, the first input shaft and the second input shaft are designed and configured to be driven separately and independently from each other. According to the another aspect of the present disclosure, the coupling unit may comprise a rotational gear (transmission/gearbox) accommodated in the trocar housing. The rotational gearbox may be designed and configured to convert a rotational movement of the second input shaft about the longitudinal second input shaft axis into a rotational movement of the surgical instrument about the longitudinal trocar direction.

In other words, the rotational movement of the surgical instrument about the longitudinal trocar direction can be caused by the trocar additionally provided with the second input shaft and the rotational gearbox. Thus, the configuration of the trocar enables to move the surgical instrument along as well as about the longitudinal trocar direction via one common drive axis.

It should be noted that the described aspect, according to which the trocar has the rotational gearbox, can also be claimed independently of the aspect described above, according to which the trocar has the transmission/gearbox. This means that the trocar can have (only) the second output shaft, by which the surgical instrument can be rotated about the longitudinal trocar direction. In this case the surgical instrument cannot be moved along the longitudinal trocar direction as described above.

According to a preferred embodiment, the rotational gearbox may comprise at least one wheel carrier being rotationally coupled to the second input shaft and rotatably supported within the trocar housing about the longitudinal trocar direction. The at least one wheel carrier may rotatably support the at least one drive wheel about its drive wheel axis and/or the at least one pressing wheel about its pressing wheel axis. As a result, the at least one drive wheel and/or the pressing wheel rotate about longitudinal trocar direction as the at least one wheel carrier rotates. This causes the instrument shaft to be rotated about the longitudinal trocar direction due to the frictional clamping of the instrument shaft between the at least one drive wheel and the at least one pressing wheel. Thus, the rotation of the surgical instrument can be effected by rotation of the at least one wheel carrier via the at least one revolving drive wheel and the at least one pressing wheel. In this way, the rotational gearbox can be integrated compactly into the installation space while converting the rotation of the second input shaft.

According to an embodiment, the rotational gearbox may be designed as a worm gear. The worm gear may preferably have a worm shaft/spindle connected to the second drive shaft in a rotationally fixed or rotationally coupled manner and a worm wheel that is connected to the wheel carrier in a rotationally fixed or rotationally coupled manner.

According to a preferred embodiment, the translational gearbox may comprise a rotation insert rotationally coupling the (first) input shaft and the drive wheel. Preferably, the drive wheel axis may be transverse, in particular perpendicular to the longitudinal trocar direction and the longitudinal input shaft axis. For example, the (first) input shaft may be rotationally coupled to the rotation insert via a first gear transmission element, and the rotation insert may be rotationally coupled to the drive wheel via a second gear transmission element. Preferably, the rotation insert may be rotatably supported within the trocar housing about the longitudinal trocar direction. Thus, the rotation about the longitudinal input shaft axis is transmitted into the rotation about the longitudinal trocar direction, and the rotation about the longitudinal trocar direction is transmitted into the rotation about the drive wheel axis. Preferably, the rotation insert may be rotatably supported relative to the wheel carrier.

Accordingly, when the wheel carrier is driven, i.e. when the second input shaft is driven, a relative rotation between the wheel carrier and the trocar housing, and thus, the rotation insert is caused, and vice versa. Consequently, rotation of the input shaft causes axial movement of the surgical instrument as well as rotation of the surgical instrument and rotation of the second input shaft causes rotation of the surgical instrument as well as axial movement of the surgical instrument, respectively. This coupling of the two driven movements (rotation and translation) of the surgical instrument, may be compensated by driving the corresponding input shaft in the opposite direction.

According to a preferred embodiment, the wheel carrier may have a receiving element being designed and configured to receive the surgical instrument with positive locking against rotation about the longitudinal trocar direction. For example, the receiving element may preferably have an oval cross-section. This prevents unintentional rotation of the surgical instrument when the translation movement is transmitted non-positively from the drive wheel to the instrument shaft, while at the same time allowing the surgical instrument to rotate in a driven manner, namely together with the wheel carrier.

Moreover, the object of the present disclosure is achieved by a minimally invasive surgical device, preferably in form of a surgical robot, equipped with the described trocar according to at least one of the above aspects. Specifically, the surgical device comprises a holding arm having the holding device which is designed and configured to hold the trocar, preferably exclusively hold the trocar. Further, the surgical device comprises the drive source which is designed and configured to drive the input shaft. The surgical device comprises an interface being designed and configured to connect the connecting piece of the trocar to the holding device as well as to the drive source via the longitudinal input shaft axis, preferably in an exchangeable manner. Thus, the desired movement of the surgical instrument as well as the holding of the trocar can be realised via the same axis, namely the longitudinal input shaft axis. Therefore, the interface can be simplified.

According to a preferred embodiment, the drive source may be designed and configured to drive the second input shaft separately and independently from the input shaft. Preferably, the interface may be designed and configured to connect the second input shaft to the drive source via the longitudinal input shaft axis, preferably in an exchangeable manner. Thus, also the drive of the second input shaft, which causes the rotational drive of the surgical instrument, can be realised via the one axis, namely the longitudinal input shaft axis. Due to just two coaxially arranged input shafts the interface can be further simplified.

According to a preferred embodiment, the surgical device may comprise the rotary angle sensor which is designed and configured to measure the rotary angle of the trocar housing. Preferably, the interface may be designed and configured to connect the angle determination portion of the centring sleeve to the rotary angle sensor via the longitudinal input shaft axis, in particular in an exchangeable manner, preferably by contact detection or contactless detection. According to the preferred embodiment, (the angle determination portion of) the centring sleeve and the rotary angle sensor may be designed and configured in such a way that the centring sleeve and the rotary angle sensor can be rotationally coupled, in particular by positive locking. Preferably, (the angle determination portion of) the centring sleeve and the rotary angle sensor may be designed and configured in such a way that the centring sleeve and the rotary angle sensor can (only) be connected to the rotary angle sensor in a predetermined rotational orientation about the longitudinal input shaft axis, for example, having a locking element on its circumference configured to engage with a corresponding locking receiving element of the rotary angle sensor in the predetermined rotational orientation. This ensures that the centring sleeve (and thus, the trocar housing) and the rotary angle sensor are aligned with each other in the predetermined orientation (rotational position). Therefore, the change in inclination of the trocar/rotary angle of the trocar housing compared to this reference predetermined rotational position can be detected.

According to a preferred embodiment, the longitudinal input shaft axis of the surgical device may be formed as a passively driven joint axis. The passively driven joint axis (also referred to as a passive joint) allows one or more degrees of freedom, but the movement of the joint axis cannot be actuated/actively controlled. In the present disclosure, this is especially the case when the trocar is already inserted into the patient's body (and is thus supported at the point/puncture of access determining the above described invariant point, e.g. like a ball joint). Accordingly, when actively moving another axis of the surgical device which is coupled to the longitudinal input shaft axis, the trocar (supported on the longitudinal input shaft axis) performs a swivel/pivot movement about the point/puncture of access. Consequently, the passive joint axis (longitudinal input shaft axis) follows the actively driven movement within the passive degrees of freedom. Further, due to the centring sleeve, it is possible to detect the swivel motion/tilt change of the trocar housing by measuring the relative rotation of the centring sleeve. The swivel/pivot movement of the trocar housing causes the (first) input shaft and/or the second input shaft to rotate, wherein the resulting movement (translation and/or rotation) of the surgical instrument can be compensated by the corresponding (counter-rotating) drive of the respective input shaft.

DESCRIPTION OF PREFERRED EMBODIMENTS

In the following two preferred embodiments of the present disclosure are described on the basis of the accompanying figures.

Design of a First Embodiment

FIGS. 1 to 14 show different views of a first preferred embodiment of a trocar 1 according to the present disclosure. The trocar 1 comprises a trocar housing 2 having a distal (operator-far/patient-close), preferably small diameter, tube portion 2a and a proximal (operator-close/patient-far), preferably large diameter, tube portion 2b. That is, the distal portion 2a has a smaller (outer) diameter than the proximal portion 2b and may preferably continue via a preferably funnel-shaped tube portion into the proximal portion 2a. The distal portion 2a is designed and configured to penetrate a patient's body, whereas the proximal portion 2b is designed and configured to extra-corporeally insert a preferably minimally invasive surgical instrument 3 into the trocar in a longitudinal trocar direction T which is hereinafter also referred to as trocar direction T. That is, the trocar 1 is adapted to receive the surgical instrument 3, which is hereinafter also referred to as instrument 3, in particular a preferably rod-shaped instrument shaft 4 of the instrument (not subject matter of the trocar 1).

The trocar 1 comprises a drive unit 5 designed and configured to move the surgical instrument 3 at least along the longitudinal trocar direction T, at least parts of the drive unit being accommodated in the trocar housing 2. Further, the trocar 1 comprises a coupling unit 6 designed and configured to couple and uncouple the drive unit to and from an external drive source 7.

The coupling unit 6 comprises an input shaft 8. The input shaft 8 is supported by the trocar housing 2 to be rotatable about a longitudinal input shaft axis A. That is, the input shaft 8 and the trocar housing 2 are connected/coupled such that they are rotatable about the longitudinal input shaft axis A relative to each other. The longitudinal input shaft axis A is hereinafter also referred to as shaft axis A. For example, the input shaft 8 may comprise a circumferential groove receiving a fastening element, e.g. in form of a pin (see FIG. 3). The fastening element may have a longitudinal axis being arranged in a plane perpendicular shaft axis A and may be coupled to the trocar housing 2. The shaft axis A is transverse, in particular perpendicular, to the trocar direction T wherein the shaft axis A does not cut the trocar axis T. Thus, the trocar housing 2 is enabled to freely pivot around an invariant pivot point which is determined by the trocar 1 in the patient's body in case the input shaft 8 is moved transverse to its shaft axis A. The input shaft 8 is designed and configured to be driven by the drive source 7 about its shaft axis A, in particular by frictional and/or positive locking. Thus, the input shaft 8 forms a drive input component for movement of the instrument 3.

The coupling unit 6 comprises a transmission/gearbox 9 (translation gear 9). The translation gear/transmission/gearbox 9 is accommodated in the trocar housing 2, in particular in the proximal tube portion 2b. The transmission/gearbox 9 is designed and configured to convert a rotational movement of the input shaft 8 about the shaft axis A into a translational movement of the instrument 3 within to the trocar 1 along the trocar direction T. Thus, a relative rotation between the trocar housing 2 and the input shaft 8 about the shaft axis A causes a relative translation between the trocar housing 2 and the instrument 3 along the trocar direction T (which is transverse, in particular perpendicular to the shaft axis A).

The coupling unit 6 comprises a connecting piece 10 formed at an free end portion of the input shaft 8 outside the trocar 2. The connecting piece 10 is laterally protruding from the trocar housing 2. The connecting piece 10 is designed and configured to exclusively mount and demount the trocar housing 2 to an external holding device 11. In other words, the connecting piece 10 is designed and configured as the only member for holding the trocar 1 at its destination and/or moving the trocar 1 to a destination in space, that is, changing a position/location or an inclination/orientation of the trocar 1. Thus, the input shaft 8 forms both the (only) connecting piece 10 for holding and/or moving the trocar 1 as well as the drive input component for the translational movement of the instrument 3 within the trocar 2. The input shaft 8, therefore, forms an (trocar-side) interface to the external drive source 7 and the external holding device 11. In other words, the exclusive mounting axis as well as the drive axis is formed by the shaft axis A.

According to the first embodiment, the trocar 1 (the transmission/gearbox 9/the drive unit 5) may comprise a drive wheel 12. Preferably, the drive wheel 12 is accommodated in the trocar housing 2, in particular the proximal tube portion 2b. More preferably, the drive wheel 12 may be rotatably supported in the trocar housing 2 about its drive wheel axis. The drive wheel 12 is fixedly coupled to the input shaft 8. The drive wheel 12 is designed and configured to roll on the instrument shaft 4 when rotated about its drive wheel axis (in this embodiment being identical with the shaft axis A) to cause the translational movement of the instrument 3. Preferably, an outer surface of the drive wheel 12 may directly contact the instrument shaft 4. The drive wheel axis is transverse, in particular perpendicular to the trocar direction T. According to the first embodiment, the drive wheel axis corresponds to the shaft axis A. Further, the drive wheel 12 may be fixed to the input shaft, e.g. in form of a separate wheel fixedly connected to the input shaft 8 or in form of an integral portion of the input shaft 8. Alternatively, the drive wheel axis may be transverse, in particular perpendicular to the shaft axis A. Further, the drive wheel 12 may be rotationally connected to the input shaft 8 via a transmission element. Preferably, the drive wheel 12 is formed as a friction wheel having a friction lining, e.g. in form of a material layer with high surface roughness, or alternatively as a profiled wheel having a profile on its surface, e.g. in form of teeth. Thus, the instrument shaft 4 can be driven in translation (that is, axially moved) by the drive wheel 12 due to the rolling/friction resistance or the profile engagement between the drive wheel 12 and the instrument shaft 4.

According to the first embodiment, the trocar 1 (the transmission/gearbox 9 or the drive unit 5) may comprise a pressing element 13. Preferably, the pressing element 13 may be accommodated in the trocar housing 2, in particular the proximal tube portion 2b. The pressing element 13 is designed and configured to press the instrument shaft 4 against the drive wheel 12. In other words, the drive wheel 12 and the pressing element 13 are designed and configured to clamp the instrument shaft 4 in between in such a way that a force resulting from rotation of the drive wheel 12 can be applied in the trocar direction T from the drive wheel 12 to the instrument shaft 4. Preferably, the pressing element 13 may be arranged at the same height along the trocar direction T. Further, the pressing element 13 may be preferably formed as a pressing wheel rotatably supported in the trocar housing 2 about its pressing wheel axis. Further, the pressing wheel may be rotatably drivable about its pressing wheel axis, that is also functioning as drive wheel causing the translational movement of the surgical instrument 3. The drive wheel axis and the pressing wheel axis may be arranged in a parallel planes perpendicular to the trocar direction T, in particular in a common plane perpendicular to the trocar direction T. For example, the pressing wheel axis may be parallel to the drive wheel axis (see FIG. 2).

According to the first embodiment, the trocar 1 (the transmission/gearbox 9 or the drive unit 5) may comprise a lever 14 coupled to the pressing element 13. The lever 14 may be in form of a knee lever or a clamping lever. The lever 14 is operable to switch the pressing element 13 between a pressing position, in which the pressing element 13 is configured to press the instrument shaft 4 against the drive wheel 12, and an instrument changing position, in which the pressing element 13 is configured to be spaced apart from the instrument shaft 4, that is, to have no contact with the instrument shaft 4/do not apply any pressing force to the instrument shaft 4. Preferably, the lever 14 may be operable from outside the trocar housing 2. For example, the lever 14 may be arranged/mounted outside the trocar housing 2. In the first embodiment, the pressing element 13 may be shifted transversely to the trocar direction T, in particular in a direction away from the drive wheel 12, by operation of the lever 14.

Even though not illustrated, according to the first embodiment, the trocar housing 2 may be preferably designed and configured to receive the instrument 3 with positive locking against rotation about the trocar direction T. For example, the trocar housing 2 may have a recess designed and configured to receive the instrument shaft 4, the recess having a cross-section deviating from a circular shape, e.g. having an oval cross-section. Thus, the instrument shaft 4 may have a corresponding oval cross-section received by the recess with positive locking against rotation about the trocar direction T.

According to the first embodiment, the trocar 1 may comprise a centring sleeve 15 having a sleeve axis corresponding to the shaft axis A. Preferably, the centring sleeve 15 may be rotatably supported on the input shaft 8 about the shaft axis A. The centring sleeve may be rotationally fixed or connectable to the trocar housing 2, in particular by positive locking. The centring sleeve 15 is designed and configured in such a way that the centring sleeve 15 can only be connected to the trocar housing 2 in a predetermined rotational orientation about the shaft axis A. For example, the centring sleeve 15 may have a locking element 16 on its circumference configured to engage with a corresponding locking receiving element 17 of the trocar housing 2 in the predetermined rotational orientation. For example, the locking receiving element 17 may be formed as a projecting portion of the trocar housing 2, protruding radially inwards only partially over an inner circumference of the trocar housing (see FIGS. 3 and 4). Preferably, the centring sleeve 15 may have an orientating portion 18 designed and configured to orientate the centring sleeve 15 in the predetermined rotational orientation when connecting the centring sleeve 15 to the trocar housing 2. For example, the orientating portion 18 may be formed as a surface tapering radially inwards over a peripheral portion of the centring sleeve 15 (see FIGS. 4 and 11), in particular tapering radially inwards toward the locking element 16. For example, the surface may be convexly curved or planar. The centring sleeve 15 may have an end face contacting the (outside of the) trocar housing 2 along the shaft axis A.

According to the first embodiment, the trocar 1 may comprise at least one angle determination element being designed and configured in such a way that a rotary angle of the angle determination element is measured by an external rotary angle sensor 20, preferably by contact detection or contactless detection of the external rotary angle sensor 20.

According to the first embodiment, the centring sleeve 15 may have an angle determination portion 19 formed at an end portion of the centring sleeve 15. The angle determination portion 19 may constitute the angel determination element. That is, the angle determination portion 19 may be designed and configured in such a way that a rotary angle (or change of a rotary angle) of the angle determination portion 19 is measured by the external rotary angle sensor 20. That is, the centring sleeve 15 serves as an (axial) extension of the trocar housing 2 in order to be able to detect the corresponding rotational position (or the change of the corresponding rotational position) of the trocar housing 2 by detecting the rotational position of the centring sleeve 15 via the external rotary angle sensor 20. Accordingly, it is, for example, possible to calibrate the trocar housing with respect to the input shaft in an original relative rotation angle as a 0° position and to detect any deviation from the original rotation angle during a robotic movement of the trocar. Alternatively, even though not explicitly shown in the Figures, the trocar 1 may comprise an angle determination transmitter, in particular in form of a magnet, being integrally rotationally coupled to the trocar housing 2 and constituting the angle determination element, in particular for contactless detection.

Figure 14:
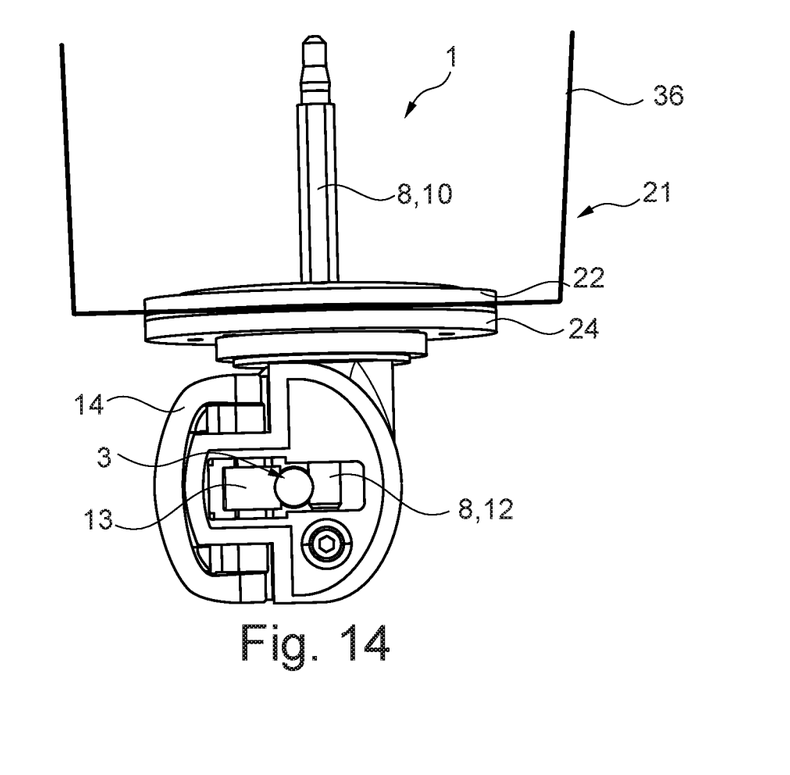

According to the first embodiment, the trocar 1 comprises a sterility barrier 21 (as can be seen in FIG. 14). The sterility barrier 21 is designed and configured to divide a sterile portion of the trocar 1 from a non-sterile portion of the trocar 1. In particular, the sterility barrier 21 is designed and configured to divide a trocar-side end portion of the input shaft 8 from a drive source-side end portion of the input shaft 8, that is from the connecting piece 10. Further, the sterility barrier 21 may be designed and configured to divide a trocar-side end portion of the centring sleeve 15 from a drive source-side end portion of the centring sleeve 15, the angle determination portion 19. Further, the sterility barrier 21 may be designed and configured to separate the angle determination transmitter from the external rotary angle sensor 20.

Figure 1:
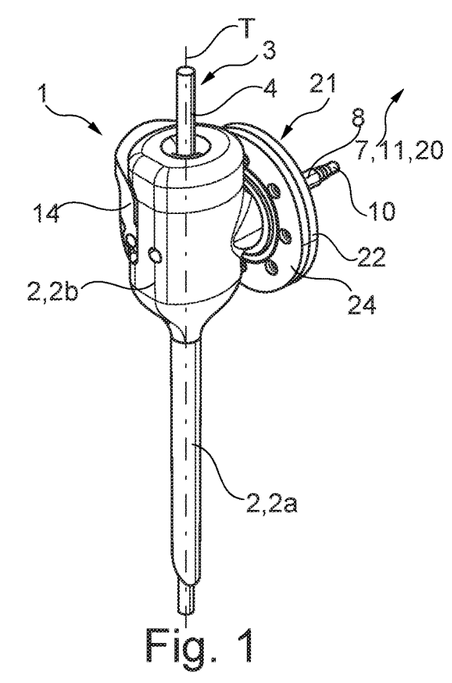
FIGS. 1 to 14 show different views of a first preferred embodiment of a trocar according to the present disclosure.
Figure 2:
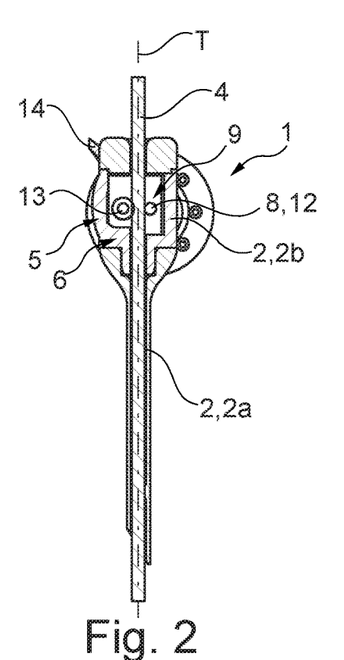
Figure 3:
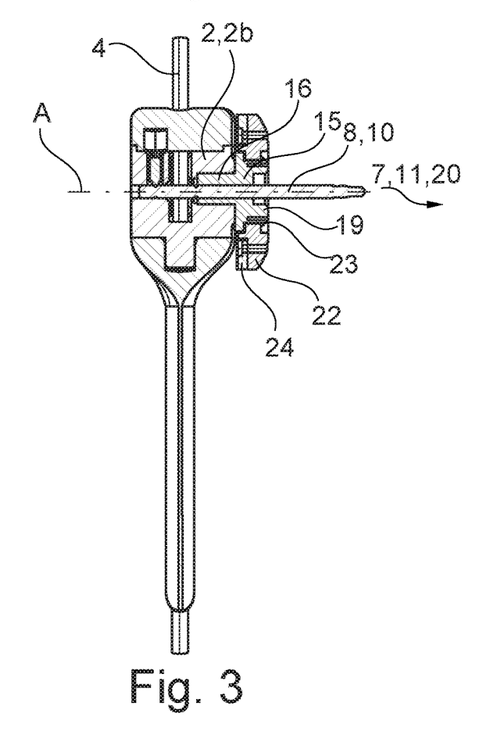
Figure 4:
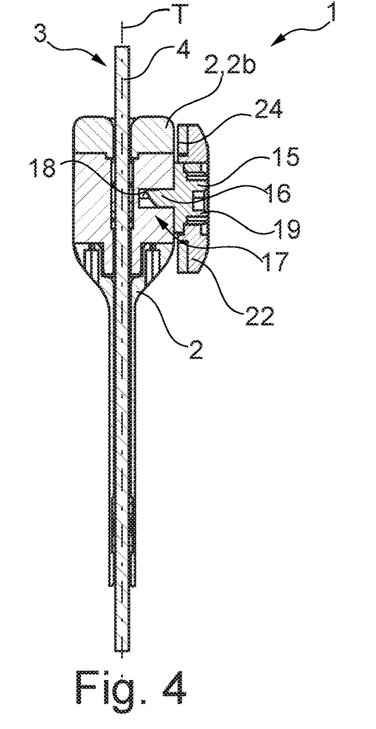
Figure 5:
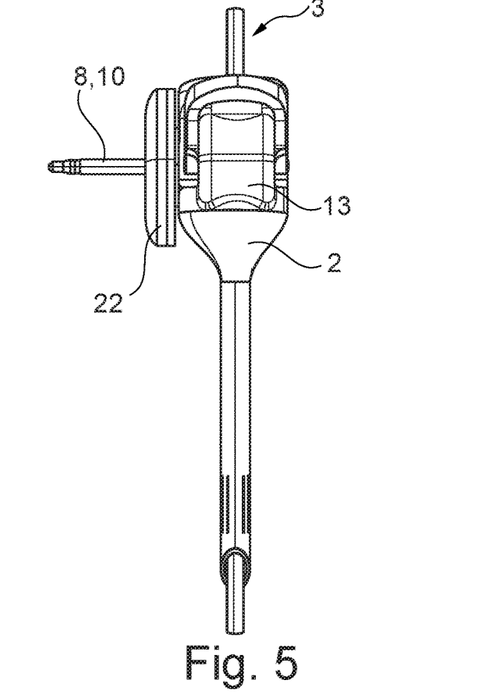
Figure 6:
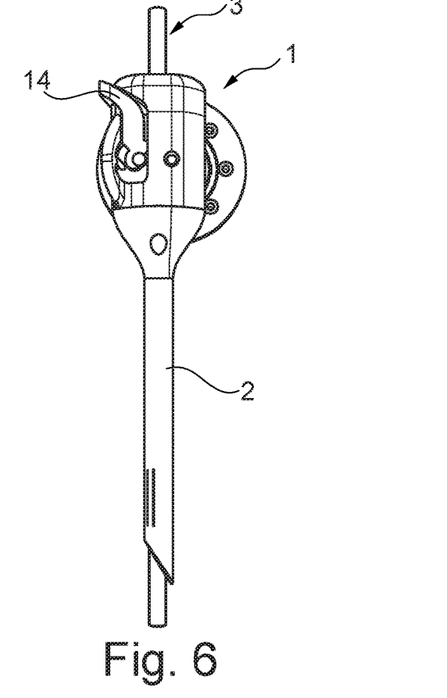
Figure 7:
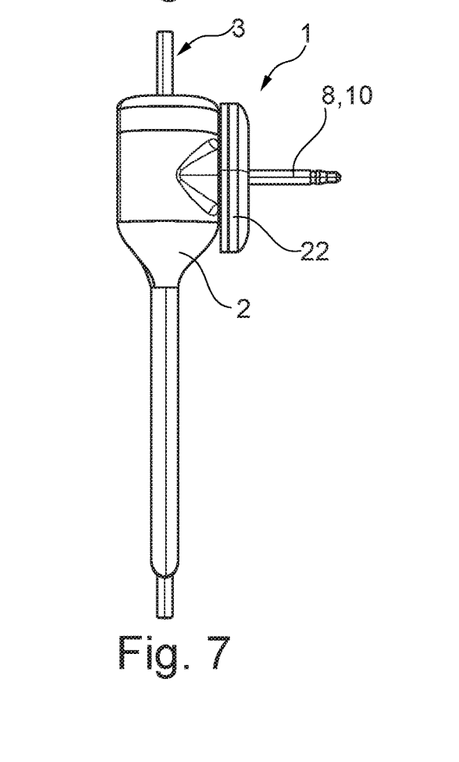
Figure 8:
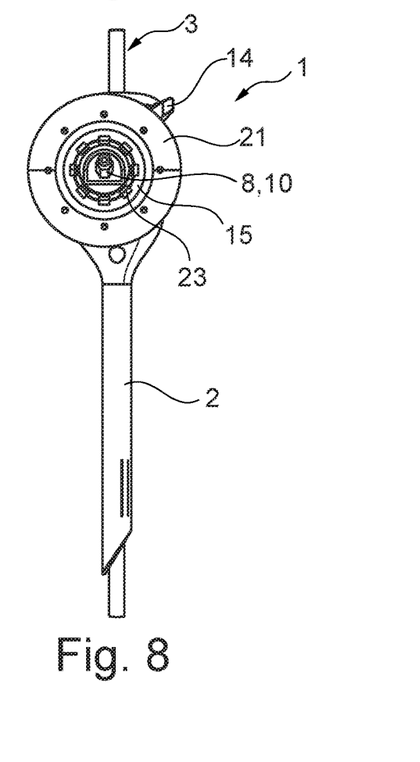
Figure 9:
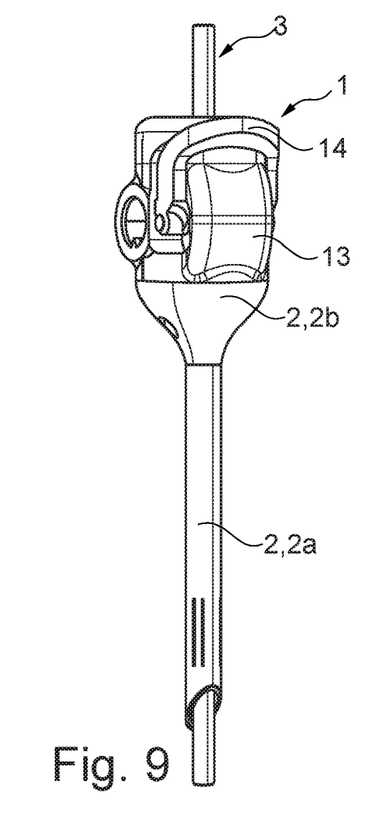
Figure 10:
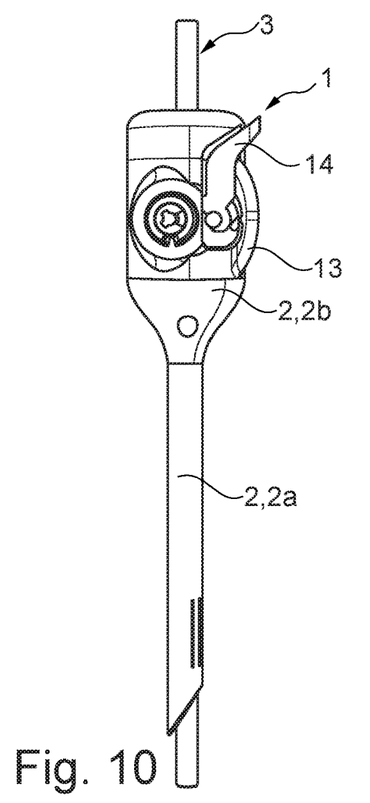
Figure 11:
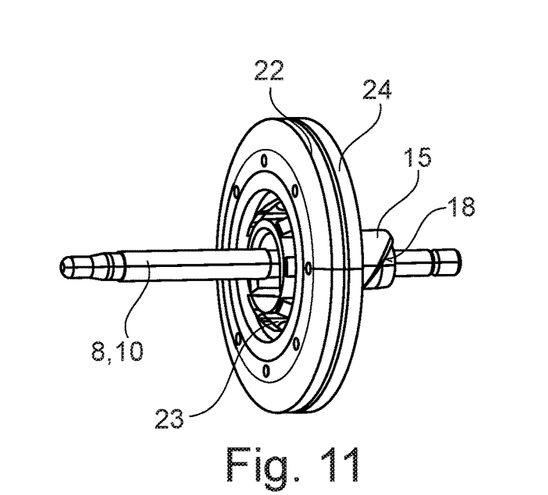
Figure 12:
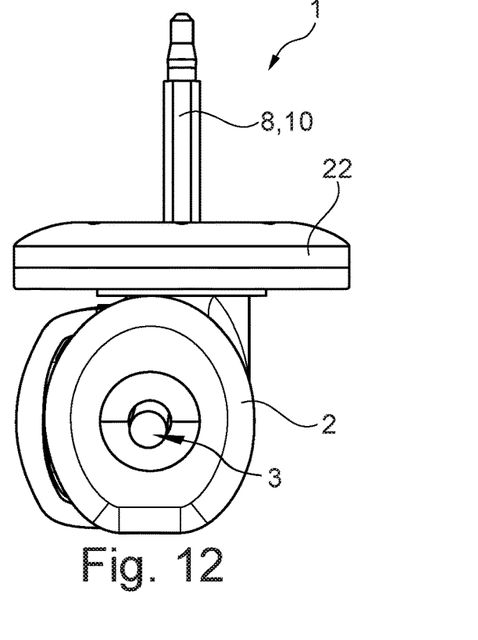
Figure 13:
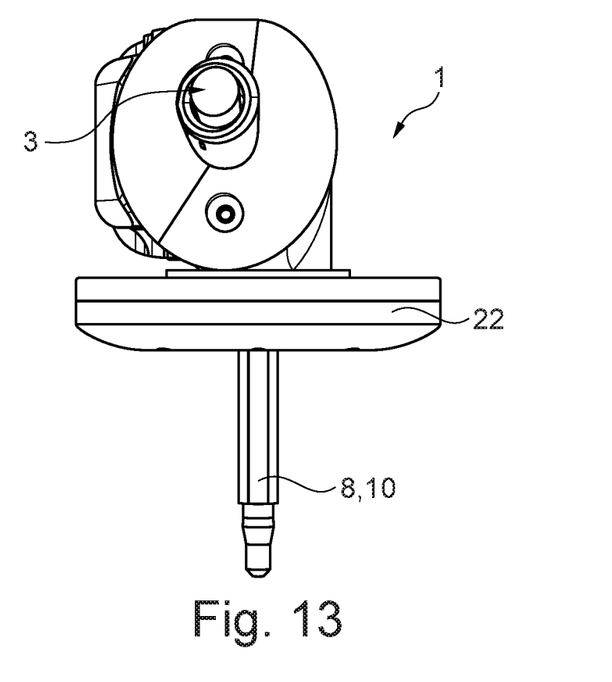

Preferably, the sterility barrier 21 may comprise a ring element 22 for receiving/connecting a sterility cover, e.g. a sterility sleeve/foil 36, to the trocar 1. The ring element 22 may have a ring axis corresponding to the shaft axis A. Preferably, the ring element 22 is rotatably supported on the input shaft 8 and/or the centring sleeve 15 such that the ring element 22 can rotate relative to the input shaft 8 and/or the trocar housing 2/the centring sleeve 15 about the shaft axis A. Preferably, the ring element 22 may be axially fixed to the centring sleeve 15, in particular in a detachable manner, e.g. by a snap connection 23 (as can be seen e.g. in FIG. 3 or FIG. 11). The sterility cover 36 may be designed and configured to cover the drive source 7 and/or the holding device 11, that is, separate the drive source 7 and/or the holding device 11 and/or the rotary angle sensor 20 from the trocar 1. The sterility cover 36 may be fixedly connected to the ring element 22, for example by an adhesive connection or by clamping the sterility cover 36 between the ring element 22 and a fixing disc 24 connected to the ring element 22, e.g. by a screw connection (as can be seen in FIGS. 3, 11 and 14).

Additionally, the trocar 1 may comprise a (not-shown) seal and/or a (not shown) valve which is designed and configured to seal an access to the patient's body, preferably arranged in the distal tube portion 2a. For example, the seal may be designed and configured to seal a gap between the instrument shaft 4 and the trocar housing 2 and/or a gap between the trocar housing 2 and the access to the patient's body.

Figure 15:
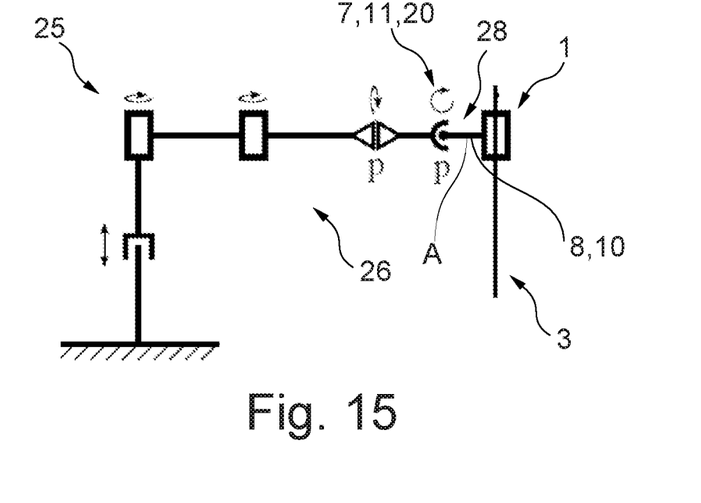
FIG. 15 shows a schematic view of a surgical device equipped with the trocar according to the present disclosure.

FIG. 15 schematically illustrates a minimally invasive surgical device 25, preferably in form of a surgical robot. The surgical device 25 may be equipped with the described trocar 1. The surgical device 25 may comprise a holding arm 26 having the holding device 11 which is being designed and configured to exclusively hold the trocar 1. The holding device 11 may be formed on a passively driven joint axis of the holding arm 26.

The surgical device 25 may comprise the drive source 7 being designed and configured to drive the input shaft 8. In particular, the drive source 7 may comprise a first motor 27 driving the input shaft 8. Further, the surgical device 25 may comprise an interface 28 being designed and configured to connect the connecting piece 10 of the trocar 1 to the holding device 11 as well as to the drive source 7, in an exchangeable manner via the shaft axis A.

The surgical device 25 may comprise the rotary angle sensor 20 being designed and configured to measure the rotary angle of the trocar housing 2. Further, the interface 28 may be designed and configured to connect the angle determination portion 19 of the centring sleeve 15 to the rotary angle sensor 20, for example, in an exchangeable manner via the shaft axis A. in particular, the centring sleeve 15 may be rotationally fixed, preferably by positive locking, to the rotary angle sensor 20. Preferably, the centring sleeve and the rotary angle sensor 20 may be connected to each other in a predetermined rotational position.

Function of the First Embodiment

For mounting the above trocar 2 to an corresponding interface of a robotic arm as shown, for example, in FIG. 15, the input shaft 8 is fixedly connected to an output element of a driving source provided at the robotic arm, wherein the trocar 2 is exclusively held by the input shaft 8. After that, a surgical instrument is inserted into the trocar 2 in its longitudinal direction wherein the lever 14 is still in an "open"—position such that the instrument shaft 4 can easily slip between the drive wheel 12 and the pressing wheel 13 into the trocar shaft 2a. As soon as the lever 14 is pivoted into its "close"—position (for example, shown in FIG. 1) the instrument shaft 4 is biased against the drive wheel 12 being fixed at the input shaft 8 such that the surgical instrument 3 cannot slip any longer within the trocar housing 2. If the drive source is actuated, for example, by a controller, the drive force is transmitted via the input shaft 8 and the drive wheel 12 to the instrument shaft 4 thereby shifting the instrument 3 along the trocar axis T.

By the robotic arm 26 the trocar 2 can be moved to a specific, pre-determined position of a patient, thereby penetrating, for example, the abdominal wall of the patient until a specific orientation relative to the abdominal wall is achieved. In this position, the relative angle between the trocar axis T and the shaft axis A is calibrated to be assumed as 0° using the centering sieve 15. If, from that state, the robotic arm will be moved, for example, in transversal direction with respect to the shaft axis A, the trocar is capable to freely pivot around the input shaft 8 such that the abdominal wall will be not stressed. This pivoting movement (change of relative angle) can be detected by the sensor 20.

It is clear that the above pivoting movement of the trocar will lead to an up—and/or down movement of the instrument within the trocar 2. However, because of the transmission ratio of the gearbox (here, diameter of driving wheel 12) the amount of movement of the instrument is negligible but can also be compensated by the not shown controller based on the detecting signals of the sensor 20.

Design of a Second Embodiment

Figure 16:
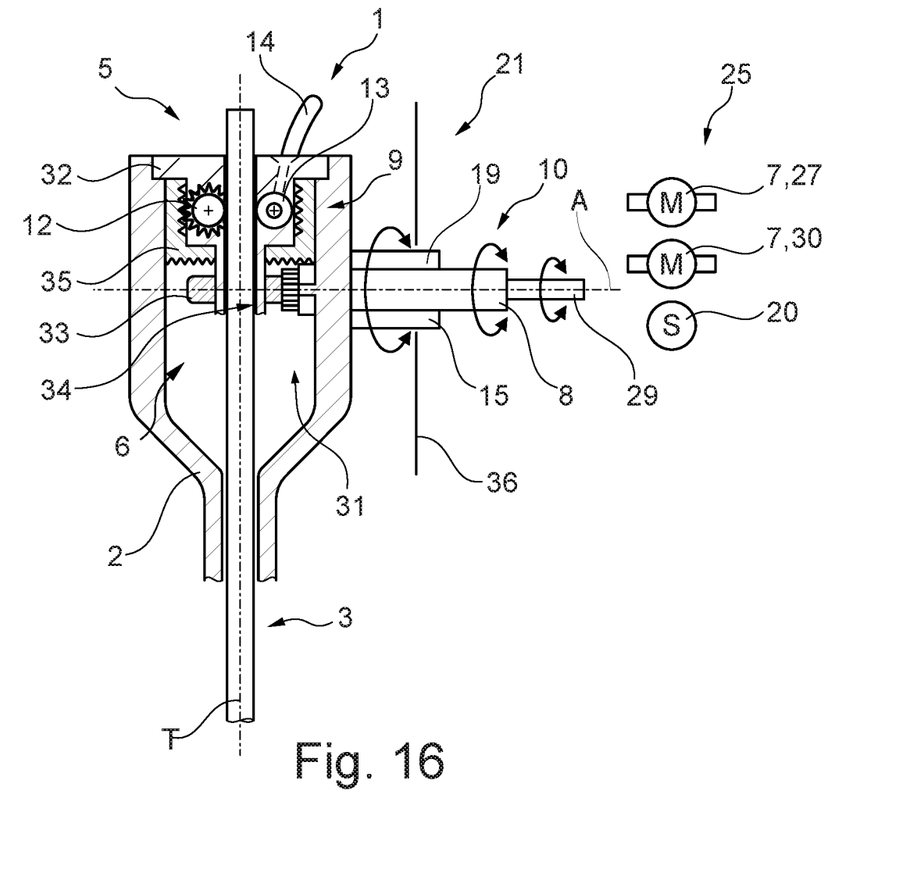
FIG. 16 shows a schematic view of a second preferred embodiment of the trocar according to the present disclosure.

FIG. 16 schematically illustrates the trocar 1 according to a second preferred embodiment. In addition to the (first) input shaft 8, the trocar 1 (the coupling unit 6) may comprise a second input shaft 29. The second input shaft 29 may be supported by the trocar housing 2 such that the second input shaft 29 is rotatable about a longitudinal second input shaft axis relative to the trocar housing 2. The longitudinal second input shaft axis corresponds may be transverse to the trocar direction T, in particular the same as the longitudinal input shaft axis. Thus, the (first) input shaft 8 and the second input shaft 29 may be arranged coaxially/have a common drive axis which is the shaft axis A. For example, the (first) input shaft 8 or the second input shaft 29 may be formed as a hollow shaft rotatably supporting the corresponding other input shaft 8, 29 therein. The (first) input shaft 8 and the second input shaft 29 may be connected so as to be relatively rotatable to each other. Further, the second input shaft 29 may be designed and configured to be driven by the drive source 7 by frictional and/or positive locking. That is, the (first) input shaft 8 and the second input shaft 29 are designed and configured to be driven by the same external drive source 7.

Preferably, the second input shaft 29 may be designed and configured to be driven by the surgical device 25 which is only schematically indicated in FIG. 16. The surgical device may comprise the (not shown) robotic/holding arm 26 having the holding device 11 as described above, the drive source 7 having the first motor 27 driving the input shaft 8 as described above, the (not shown) interface 28 connecting the connecting piece 10 as described above, and the rotary angle sensor 20 measuring the rotary angle of the trocar housing 2 (the centring sleeve 15) as described above. In addition, the drive source 7 of the surgical device 25 may comprise a second motor 30 driving the second input shaft 29. Hereby, the (first) input shaft 8 and the second input shaft 29 are designed and configured to be driven separately and independently from each other. The connecting piece 10 may be formed at an end portion of the input shaft 8 and/or the second input shaft 29.

According to the second embodiment, the trocar 1 (the coupling unit 6) may comprise the transmission/gearbox 9 (as described above in connection with the first embodiment). The transmission/gearbox 9 is accommodated in the trocar housing 2, in particular in the proximal tube portion 2b. The transmission/gearbox 9 is designed and configured to convert a rotational movement of the input shaft 8 about the shaft axis A into a translational movement of the instrument 3 within the trocar 1 along the trocar direction T.

According to the second embodiment, the transmission/gearbox 9 may comprise the drive wheel 12 (as described above in connection with the first embodiment). Preferably, the drive wheel 12 is accommodated in the trocar housing 2, in particular the proximal tube portion 2b. More preferably, the drive wheel 12 is rotatably supported in the trocar housing 2 about/around its drive wheel axis. The drive wheel 12 is rotationally coupled to the input shaft 8 via a transmission element. The drive wheel axis may be perpendicular to the trocar direction T as well as perpendicular to the shaft axis A. Preferably, the drive wheel 12 is formed as a friction wheel having a friction lining, e.g. in form of a material layer with high surface roughness, or alternatively as a profiled wheel having a profile on its surface, e.g. in form of teeth. Thus, the instrument shaft 4 can be driven in translation (that is, axially moved) by the drive wheel 12 due to the rolling/friction resistance or the profile engagement between the drive wheel 12 and the instrument shaft 4.

According to the second embodiment, the transmission/gearbox 9 comprises the pressing element 13 (as described above in connection with the first embodiment). Preferably, the pressing element 13 is accommodated in the trocar housing 2, in particular the proximal tube portion 2b. The pressing element 13 is designed and configured to press the instrument shaft 4 against the drive wheel 12. Preferably, the pressing element 13 is arranged at the same height along the trocar direction T. Further, the pressing element 13 is preferably formed as a pressing wheel rotatably supported in the trocar housing 2 about its pressing wheel axis. The pressing wheel axis may be perpendicular to the trocar direction T as well as perpendicular to the shaft axis A.

According to the second embodiment, the transmission/gearbox 9 comprises the lever 14 coupled to the pressing element 13 (as described above in connection with the first embodiment). The lever 14 may be in form of a knee lever or a clamping lever. The lever 14 is operable to switch the pressing element 13 between a pressing position ("close"—position), in which the pressing element 13 is configured to press the instrument shaft 4 against the drive wheel 12, and an instrument changing position ("open"—position), in which the pressing element 13 is configured to be spaced apart from the instrument shaft 14, that is, to have no/low contact with the instrument shaft 4/do not apply any/small pressing force to the instrument shaft 4. Preferably, the lever 14 may be operable from outside the trocar housing 2. For example, the lever 14 may be arranged/mounted outside the trocar housing 2. In the first embodiment, the pressing element 13 may be shifted transversely to the trocar direction T, in particular in a direction away from the drive wheel 12, by operation of the lever 14.

According to the second embodiment, the trocar 1 (the coupling unit 6) comprises a rotational gearbox/transmission 31. The rotational gearbox 31 is accommodated in the trocar housing 2, in particular in the proximal tube portion 2b. The rotational gearbox 31 is designed and configured to convert a rotational movement of the second input shaft 29 about the shaft axis A into a rotational movement of the surgical instrument 3 about the trocar direction T.

According to the second embodiment, the rotational gearbox 31 comprises a wheel carrier 32. The wheel carrier 32 is rotationally coupled to the second input shaft 29. The wheel carrier 32 is rotatably supported within the trocar housing 2 about the trocar direction T. Preferably, the wheel carrier 32 rotatably supports the drive wheel 12 about its drive wheel axis. Preferably, the wheel carrier 32 rotatably supports the pressing wheel 13 about its pressing wheel axis. The rotational gearbox 31 is designed as a worm gear. Preferably, the worm gear may have a worm shaft/spindle 33 connected to the second drive shaft 29 in a rotationally fixed or rotationally coupled manner, and a worm wheel 34 that is connected to the wheel carrier 32 in a rotationally fixed or rotationally coupled manner. The wheel carrier 32 may have a receiving element being designed and configured to receive the surgical instrument 3 with positive locking against rotation about the trocar direction T. For example, the receiving element may preferably have an oval cross-section.

According to the second embodiment, the transmission/gearbox 9 comprises a rotation insert 35 rotationally coupling the (first) input shaft 8 and the drive wheel 12. The rotation insert 35 forms the transmission element as described above. For example, the (first) input shaft 8 may be rotationally coupled to the rotation insert 35 via a first gear/transmission element, and the rotation insert 35 may be rotationally coupled to the drive wheel 12 via a second gear transmission element. Preferably, the rotation insert 35 may be rotatably supported within the trocar housing 2 about the trocar direction T. Preferably, the rotation insert 35 is rotatably supported relative to the wheel carrier 32.

According to the second embodiment, the trocar 1 may comprise the at least one angle determination element being designed and configured in such a way that the rotary angle of the angle determination element is measured by the external rotary angle sensor 20, preferably by contact detection or contactless detection of the external rotary angle sensor 20.

According to the second embodiment, the trocar 1 may comprise the centring sleeve (as described above in connection with the first embodiment). The centring sleeve 15 has a sleeve axis corresponding to the shaft axis A. Preferably, the centring sleeve 15 is rotatably supported on the input shaft 8 about the shaft axis A. The centring sleeve 15 is rotationally fixed or connectable to the trocar housing 2, in particular by positive locking. The centring sleeve 15 is designed and configured in such a way that the centring sleeve can only be connected to the trocar housing 2 in a predetermined rotational orientation about the shaft axis A. The centring sleeve 15 has the angle determination portion 19 formed at an end portion of the centring sleeve 15. The angle determination portion 19 may constitute the angle determination element. Preferably, the angle determination portion 19 may be designed and configured in such a way that a rotary angle of the angle determination portion 19 is measured by an external rotary angle sensor 20. That is, the centring sleeve 15 serves as an (axial) extension of the trocar housing 2 in order to be able to detect the corresponding rotational position of the trocar housing 2 by detecting the rotational position of the centring sleeve 15 via the external rotary angle sensor 20. Alternatively, even though not explicitly shown in the Figures, the trocar 1 may comprise an angle determination transmitter, in particular in form of a magnet, being integrally rotationally coupled to the trocar housing 2 and constituting the angle determination element, in particular for contactless detection.

According to the second embodiment, the trocar 1 may comprise the sterility barrier 21 (as described above in connection with the first embodiment). The sterility barrier 21 may have/receive a plastic foil/sleeve 36 to divide a sterile portion of the trocar 1 (left side) from a non-sterile portion of the trocar 1 (right side). The sterility barrier 21 may divide a trocar-side end portion of the input shaft 8 from a drive source-side end portion of the input shaft 8. The sterility barrier 21 may divide a trocar-side end portion of the centring sleeve from a drive source-side end portion of the centring sleeve 15. The sterility barrier 21 may divide a trocar-side end portion of the second input shaft 29 from a drive source-side end portion of the second input shaft 29. Further, the sterility barrier 21 may be designed and configured to separate the angle determination transmitter from the external rotary angle sensor 20.

Figure 16A:
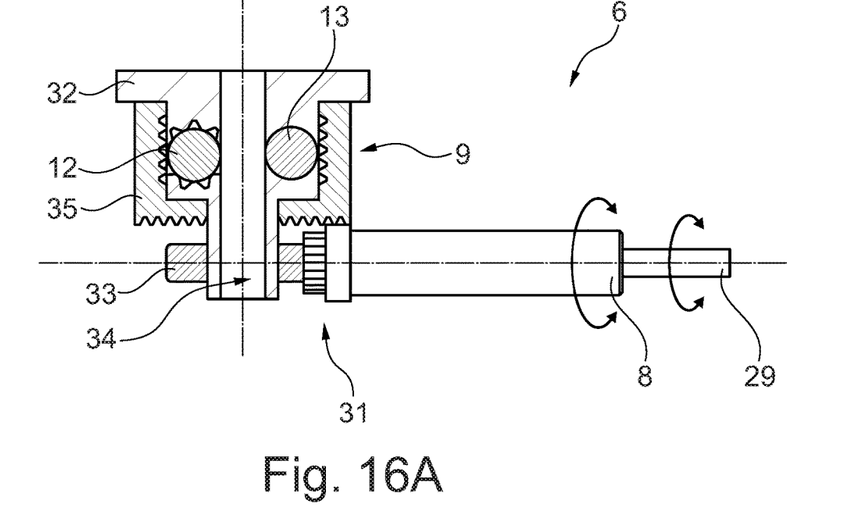
FIG. 16A shows a schematic view of a coupling unit of the trocar according to the second preferred embodiment for explanatory purpose.

FIG. 16A shows a schematic view of the coupling unit 5 of the trocar 1 according to the second preferred embodiment for explanatory purpose, omitting the trocar housing 2 and other elements not part of the coupling unit 5.

As can be seen, the coupling unit 6 mainly has—for axial drive of the (not shown) instrument 3—the first input shaft 8 and the transmission 9. The transmission 9 according to the second embodiment preferably comprises the drive wheel 12 which may be directly coupled to the input shaft 8 (as shown in FIGS. 1 to 15) or by the rotation insert 35 (transmitting the rotation from the input shaft 8 to the drive wheel 12) (as shown in FIGS. 16, 16A, 17A and 17B). The drive wheel 12 is designed and configured to roll on the instrument 3 when rotated about its drive wheel axis to cause the translational movement of the instrument 3. The transmission 9 according to the second embodiment may further preferably comprise the pressing element 13 for providing the counterforce as described in detail above.

Further, the coupling unit 6 mainly has—for rotational drive of the (not shown) instrument 3—the second input shaft 29 and the rotational gearbox 31. The rotational gearbox 31 preferably comprises the wheel carrier 32 (which may be coupled to the second input shaft 29 by the worm shaft 33 and the worm wheel 34). The wheel carrier 32 may be adapted to be connected to the (not shown) instrument such that they are integrally rotating, for example by the drive wheel 12 and the pressing element 13 clamping the instrument 3 in-between and revolving about the wheel carrier axis.

Figure 17A:
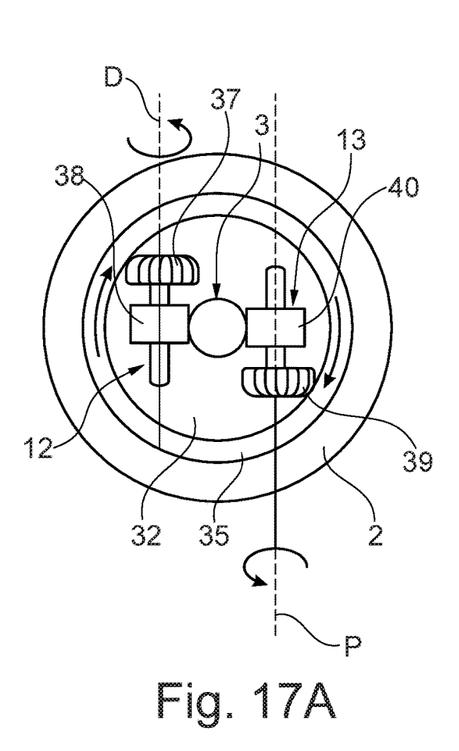
FIGS. 17A and 17B show schematic plan views of the trocar according to the second preferred embodiment.
Figure 17B:
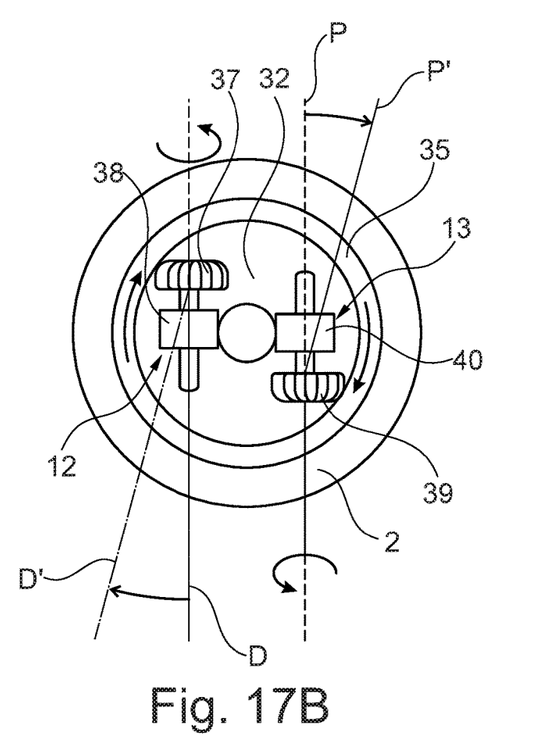

FIGS. 17A and 17B show schematic plan views of the trocar 1 according to the second preferred embodiment. As can be seen, the drive wheel axis is referenced with D, and the pressing wheel axis is referenced with P. The drive wheel 12 and the pressing element 13 may be preferably diametrically opposed to each other, that is, arranged on opposite sides of the instrument 3 clamping the instrument 3 in-between. Further, the drive wheel axis D and the pressing wheel axis P may be arranged in a common plane perpendicular to the trocar direction T.

Further, the drive wheel 12 may preferably comprise a driven portion 37 engaging with the rotational insert 35 such that the rotation of the rotation insert 35 about the trocar direction rotates the drive wheel 12 about its drive wheel axis D. Further, the drive wheel 12 may preferably comprise a roll portion 38 rolling (or being configured to roll) on the instrument 3 such that the translational movement of the instrument 3 is caused. The driven portion 37 and the roll portion 38 may be arranged axially spaced/side by side along the drive wheel axis D.

Further, the pressing element (wheel) 13 may preferably be rotatably drivable about the pressing wheel axis P. Preferably, the pressing element (wheel) 13 may be rotatably drivable by engaging with the rotational insert 35. Alternatively, the pressing element (wheel) 13 may be rotatably drivable, separately and independently from the rotational drive of the drive wheel 12. The pressing element (wheel) 13 may comprise a driven portion 39 engaging with the rotational insert 35 such that the rotation of the rotation insert about the trocar direction rotates the pressing element (wheel) 13 about its pressing wheel axis P. Further, the pressing element (wheel) 13 may preferably comprise a clamping portion 40 pressing the instrument 3 against the drive wheel 12. The clamping portion 40 may roll (or be configured to roll) on the instrument 3 also causing the translational movement of the instrument 3. That is, the pressing element (wheel) 13 may also function as drive wheel 12 causing the translational movement of the instrument 3 The driven portion 39 and the clamping portion 40 may be arranged axially spaced/side by side along the pressing wheel axis P.

FIG. 17B show the operation of switching the pressing element (wheel) 13 between the pressing position and the instrument changing position. In the pressing position the pressing element 13 may be configured to press the instrument shaft 4 against the drive wheel 12. That is, the pressing element (wheel) 13 (the clamping portion 40) contacts the instrument 3. In the instrument changing position the pressing element (wheel) 13 may be configured to be spaced apart from the instrument shaft 4. That is, the pressing element (wheel) 13 (the clamping portion 40) does not contact the instrument 3. For switching between the positions the pressing element (wheel) 13 may be shifted away from (and towards) the instrument 3, in particular by shifting the pressing wheel axis P to a shifted pressing wheel axis P' such that the pressing element (wheel) 13 releases the clamping of the instrument 3 between the pressing element (wheel) 13 and the drive wheel 12.

Further, the drive wheel 12 may additionally (as shown in FIG. 17B) or instead of shifting the pressing element 13 (not shown in the FIGS.) be operable to switch between a pressing position, in which the drive wheel 12 (the roll portion 38) is configured to contact the instrument 3/to roll on the instrument 3, and an instrument changing position, in which the drive wheel 12 (the roll portion 38) is configured to be spaced apart from the instrument 3. For switching between the positions the drive wheel 12 may be shifted away from (and towards) the instrument 3, in particular by shifting the drive wheel axis D to a shifted drive wheel axis D' such that the drive wheel 12 releases the clamping of the instrument 3 between the pressing element 13 and the drive wheel 12.

The invention claimed is:

1. A trocar for minimally invasive surgery, comprising:
a trocar housing having a distal tube portion designed and configured to penetrate a patient's body, and a proximal tube portion designed and configured to extra-corporeally insert a surgical instrument into the trocar in a longitudinal trocar direction;
a drive unit designed and configured to move the surgical instrument at least along the longitudinal trocar direction, at least one or more parts of the drive unit being accommodated in the trocar housing; and
a coupling unit designed and configured to couple and uncouple the drive unit to and from an external drive source;
wherein the coupling unit comprises:
an input shaft being supported by the trocar housing such that the input shaft is rotatable about a longitudinal input shaft axis relative to the trocar housing, the longitudinal input shaft axis being transverse to the longitudinal trocar direction, the input shaft being designed and configured to be driven by the drive source by frictional and/or positive locking, and
a transmission/gearbox accommodated in the trocar housing, and designed and configured to convert a rotational movement of the input shaft about the longitudinal input shaft axis into a translational movement of the surgical instrument within to the trocar along the longitudinal trocar direction.

2. The trocar according to claim 1, wherein the coupling unit comprises a connecting piece being designed and configured as that element by which the trocar housing is mounted and demounted to and from an external holding device, the connecting piece forming a mounting/holding axis of the trocar, the mounting/holding axis corresponding to the longitudinal input shaft axis.

3. The trocar according to claim 2, wherein the connecting piece is formed at a first end portion of the input shaft and laterally protrudes from the trocar housing.

4. The trocar according to claim 1, wherein the trocar comprises at least one angle determination element being designed and configured in such a way that a rotary angle of the angle determination element is measured by an external rotary angle sensor.

5. The trocar according to claim 4, wherein the trocar comprises at least one centring sleeve being rotationally coupled to the trocar housing and having an angle determination portion, the angle determination portion constituting the angle determination element.

6. The trocar according to claim 4, wherein the trocar comprises an angle determination transmitter being integrally rotationally coupled to the trocar housing and constituting the angle determination element, wherein the angle determination transmitter is arranged and formed in such a way that its position varies depending on the rotary angle of the angle determination element.

7. The trocar according to claim 1, wherein the trocar comprises a sterility barrier being designed and configured to separate non-sterile parts of the trocar from sterile parts of the trocar.

8. The trocar according to claim 2, wherein:
the trocar comprises a sterility barrier being designed and configured to separate non- sterile parts of the trocar from sterile parts of the trocar; and
the sterility barrier is designed and configured to separate the connecting piece from the drive unit and/or the trocar housing.

9. The trocar according to claim 2, wherein:
the trocar comprises a sterility barrier being designed and configured to separate non-sterile parts of the trocar from sterile parts of the trocar; and
the sterility barrier is designed and configured to be fixed to the external holding device and supported rotatably about the longitudinal input shaft axis relative to the trocar housing and/or the input shaft.

10. The trocar according to claim 1, wherein the trocar housing has at least one receiving element being designed and configured to receive the surgical instrument with positive locking against rotation about the longitudinal trocar direction, the at least one receiving element having an oval cross-section.

11. The trocar according to claim 1, wherein the coupling unit comprises:
a second input shaft being supported by the trocar housing such that the second input shaft is rotatable about a longitudinal second input shaft axis relative to the trocar housing, the longitudinal second input shaft axis being transverse to the longitudinal trocar direction, the second input shaft being designed and configured to be driven by the drive source by frictional and/or positive locking, and
a rotational gearbox accommodated in the trocar housing, and designed and configured to convert a rotational movement of the second input shaft about the longitudinal second input shaft axis into a rotational movement of the surgical instrument about the longitudinal trocar direction.

12. The trocar according to claim 11, wherein the rotational gearbox comprises at least one wheel carrier being rotationally coupled to the second input shaft and rotatably supported within the trocar housing about the longitudinal trocar direction, the at least one wheel carrier rotatably supporting the at least one drive wheel about its drive wheel axis and/or the at least one pressing wheel about its pressing wheel axis.

13. The trocar according to claim 12, wherein the at least one wheel carrier has at least one receiving element being designed and configured to receive the surgical instrument with positive locking against rotation about the longitudinal trocar direction, the at least one receiving element having an oval cross-section.

14. A minimally invasive surgical device equipped with the trocar according to claim 2, the surgical device comprising
a holding arm having the holding device being designed and configured to hold the trocar, the drive source being designed and configured to drive the input shaft, and an interface being designed and configured to connect the connecting piece of the trocar to the holding device as well as to the drive source via the longitudinal input shaft axis.

15. The minimally invasive surgical device according to claim 14, wherein the drive source is designed and configured to drive the second input shaft separately and independently from the input shaft.

* * * * *